US011074707B2

(12) United States Patent
Zhai et al.

(10) Patent No.: US 11,074,707 B2
(45) Date of Patent: Jul. 27, 2021

(54) METHOD AND SYSTEM OF ANTENNA MEASUREMENT FOR MOBILE COMMUNICATION BASE STATION

(71) Applicant: WUYI UNIVERSITY, Jiangmen (CN)

(72) Inventors: Yikui Zhai, Jiangmen (CN); Qirui Ke, Jiangmen (CN); Junying Gan, Jiangmen (CN); Wenbo Deng, Jiangmen (CN); Ying Xu, Jiangmen (CN); Junying Zeng, Jiangmen (CN); Zilu Ying, Jiangmen (CN); Wenlue Zhou, Jiangmen (CN); Yihang Zhi, Jiangmen (CN); Xi Wu, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 58 days.

(21) Appl. No.: 16/540,029

(22) Filed: Aug. 13, 2019

(65) Prior Publication Data
US 2021/0049782 A1    Feb. 18, 2021

(51) Int. Cl.
*G06T 7/60* (2017.01)
*G06T 7/136* (2017.01)
*G06K 9/62* (2006.01)

(52) U.S. Cl.
CPC .............. *G06T 7/60* (2013.01); *G06K 9/6256* (2013.01); *G06T 7/136* (2017.01); *G06T 2207/10016* (2013.01); *G06T 2207/10032* (2013.01); *G06T 2207/20081* (2013.01); *G06T 2207/30242* (2013.01)

(58) Field of Classification Search
CPC . G06T 7/60; G06T 7/136; G06T 2207/30242; G06T 2207/10032; G06T 2207/10016; G06T 2207/20081; G06K 9/6256
See application file for complete search history.

(56) References Cited

U.S. PATENT DOCUMENTS 10,453,197 B1 * 10/2019 Cholakkal .............. G06N 3/084
10,565,787 B1 *  2/2020 Jordan .................... G06T 7/33
(Continued)

OTHER PUBLICATIONS

Geise, et al., "A Crane Based Portable Antenna Measurement System—System Description and Validation", IEEE Transactions on Antennas and Propagation, vol. XX, No. X, XX 2019 (2019); 12 pages.
(Continued)

*Primary Examiner* — Ming Y Hon
(74) *Attorney, Agent, or Firm* — Arc IP Law, PC; Joseph J. Mayo

(57) ABSTRACT

A method and system for mobile communication base station antenna measurement is disclosed. The method comprises steps of: acquiring a set of images containing antennas of a base station; processing the set of images with a model based on instance segmentation network, and generating visualized images corresponding to the set of images of antennas; calculating, from the visualized images, the quantity of antennas of the base station and separating data for each antenna; measuring parameters of each antenna by data fitting. The system comprises a processor and a memory storing program instructions thereon, the program instructions executable by the processor to cause the system to perform the steps of the method.

13 Claims, 10 Drawing Sheets

(56) References Cited

U.S. PATENT DOCUMENTS

| | | | | |
|---|---|---|---|---|
| 2004/0214567 | A1* | 10/2004 | Yoon | H04W 16/18 455/424 |
| 2006/0217122 | A1* | 9/2006 | Levit | H04W 16/18 455/446 |
| 2009/0102730 | A1* | 4/2009 | Son | H04B 17/327 343/703 |
| 2014/0298181 | A1* | 10/2014 | Rezvan | H01Q 1/246 715/734 |
| 2015/0016379 | A1* | 1/2015 | Nam | H04B 7/0619 370/329 |
| 2017/0024929 | A1* | 1/2017 | Priest | G06T 17/05 |
| 2017/0046873 | A1* | 2/2017 | Terry | G06T 17/05 |
| 2017/0077586 | A1* | 3/2017 | Li | H01Q 1/125 |
| 2017/0244937 | A1* | 8/2017 | Meier | B64D 47/08 |
| 2017/0256049 | A1* | 9/2017 | Yang | G01B 11/02 |
| 2020/0410710 | A1* | 12/2020 | Deng | G06T 7/73 |

OTHER PUBLICATIONS

Garcia-Fernandez, et al., "Unmanned Aerial System for Antenna Measurement (UASAM)", 12$^{th}$ European Conference on Antennas and Propagation (EuCAAP 2018); 3 pages.

Shakhatreh, et al., "Unmanned Aerial Vehicles (UAVs): A survey on Civil Applications and Key Research Challenges", IEEE Access vol. 7; (Published Apr. 22, 2019); pp. 48572-48634 (63 pages).

Shahzad, et al., "Buildings Detection in VHR SAR Images Using Fully Convulsion Neural Networks", IEEE Transactions on Geoscience and Remote Sensing, vol. 57, No. 2 (Feb. 2019); pp. 1100-1116 (17 pages).

Girschick, Ross, "Fast R-CNN", ICCV Computer Vision Foundation (2015); pp. 1440-1448 (9 pages).

Liu, et al., "SSD: Sigle Shot MultiBox Detector"; Proceedings of the European Conference on Computer Vision (2016); 17 pages.

Redmon, et al., "You Only Look Once; Unified, Real-Time Object Detection", 2016 IEEE Conference on Computer Vision and Pattern Recognition (2016); pp. 779-788 (10 pages).

Ren, et al., "Faster R-CNN: Towards Real-Time Object Detection with Region Proposal Networks", Microsoft Research (Jun. 2015); 9 pages.

Chen, et al, "Encoder-Decoder with Atrous Separable Convolution for Semantic Image Segmentation", Google Inc.; European Conference on Computer Vision (2018); 18 pages.

Want, et al., "Understanding Convolution for Semantic Segmentation", IEEE Winter Conference on Applications of Computer Vision (2017);10 pages.

Chen, et al., "DeepLab: Semantic Image Segmentation with Deep Convolutional Nets, Atrous Convolution, and Fully Connected CRFs", IEEE Transactions on Pattern Analysis and Machine Intelligence (Jun. 2016); 14 pages.

Long, et al., "Fully convolutional Networks for Semantic Segmentation", IEEE Conference on Computer Vision and Pattern Recognition (Jun. 2015); 10 pages.

He, et al., "Mask R-CNN", IEEE International Conference on Computer Vision and Patter Recognition (2017); pp. 2961-2969 (9 pages).

* cited by examiner

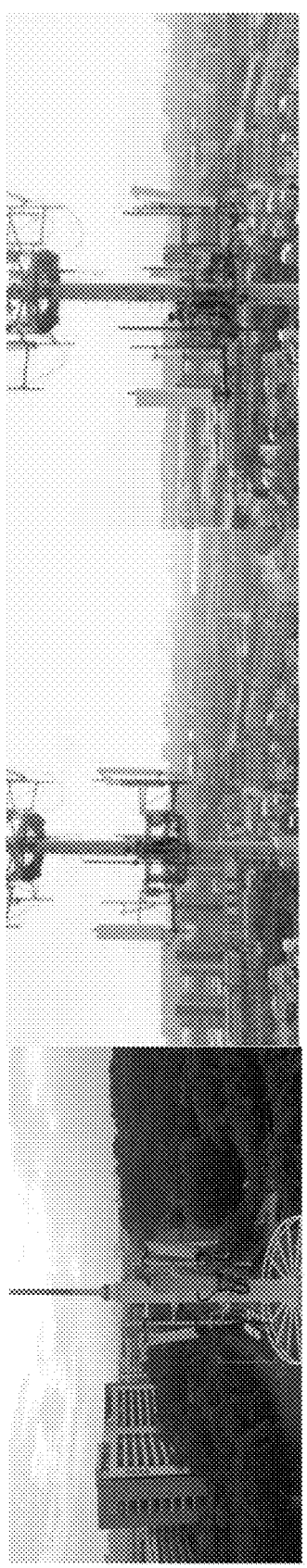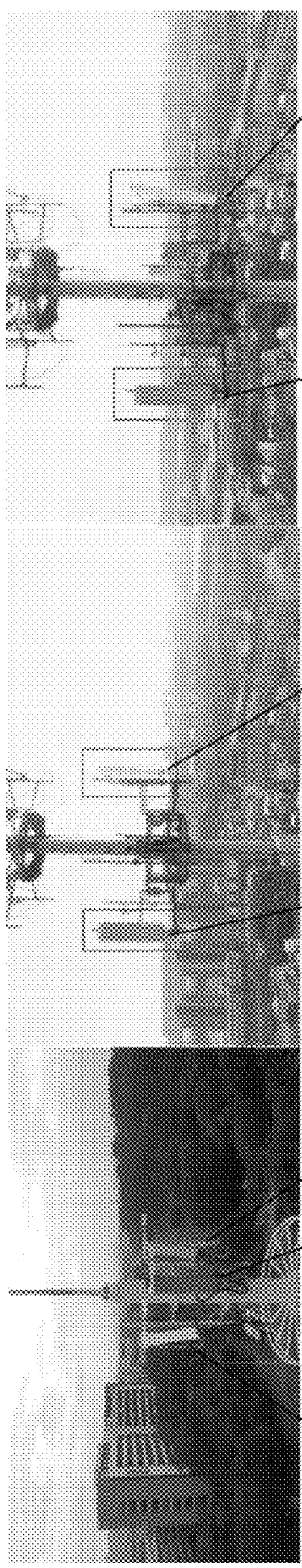

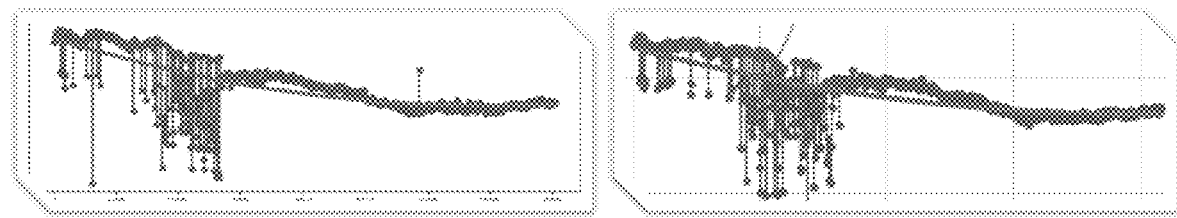
Fig.10
Fig.11A down-tilt angle   Fig.11B area   Fig.11C aspect ratio
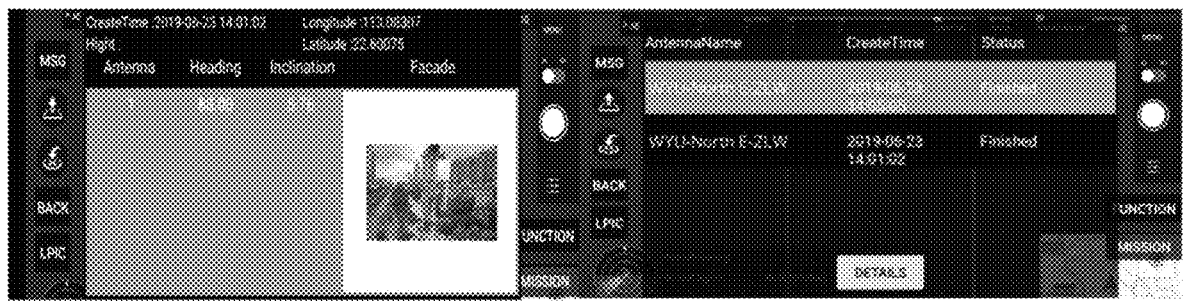
Fig.12

METHOD AND SYSTEM OF ANTENNA MEASUREMENT FOR MOBILE COMMUNICATION BASE STATION

BACKGROUND OF THE INVENTION

Field of the Invention

The present disclosure relates to method and system for antenna measurement, and more specifically to method and system for mobile communication base station antenna measurement.

Description of the Related Art

Mobile communication base station serves to transmit radio transmission and reception stations between mobile communication switching center and mobile terminal within a certain radio coverage area. Down-tilt angle of antenna of mobile communication base station is set according to the coverage requirements of the network, which correlates with topography, size of traffic and quality of network service. To meet public's communication needs, an increasing number of base stations are built, leading to an exponential growth in the need of antenna down-tilt angle adjustments. Traditional antenna measurements are measured by professional workers with rulers; yet, due to the massive number of base stations, the high possibility of deviation of manual measured data and the complex environment, it is extremely difficult to guarantee the timeliness of data and the safety of professional workers. Typically, traditional base station antenna measurement methods conducted with professional worker climbing towers tend to raise safety and inefficiency concerns in practical application.

Therefore, out of the concerns mentioned above, traditional antenna measurement method gradually loses people's preference. With growing attention on safety issue, some researches have proposed multiple methods to measure antennas [1-2]. Geise et al. [1] introduced a portable near-field antenna measurement system that could accurately measure the position and orientation of the probe antenna during the near-field scan by 6D laser tracking system. Garcia et al. [2] developed an unmanned aerial system for antenna measurements that used a real-time dynamics meter and a laser altimeter to geographic matching the measurements on centimeter level. What mentioned above are state-of-the-art methods in antenna parameters measurement. However, they all share the same features as strict hardware requirements and high capital consumption, which makes them difficult to apply in practice.

Accordingly, it is desirable to provide a method and system that can efficiently measuring parameters of antennas while reducing manual efforts and hardware costs.

BRIEF SUMMARY OF THE INVENTION

In accordance with one or more embodiments of the present disclosure, a method for mobile communication base station antenna measurement is proposed. The method comprises steps of:
  acquiring a set of images containing antennas of a base station;
  processing the set of images with a model based on instance segmentation network, and generating visualized images corresponding to the set of images of antennas;
  calculating, from the visualized images, quantity of antennas of the base station and separating data for each antenna;
  measuring parameters of each antenna by data fitting.

In accordance with one or more embodiments of the present disclosure, a system for mobile communication base station antenna measurement is proposed. The system comprises a processor and a memory storing program instructions thereon, the program instructions executable by the processor to cause the system to perform:
  acquiring a set of images of antennas of a base station;
  processing the set of images with a model based on instance segmentation network, and generating visualized images corresponding to the set of images of antennas;
  calculating, from the visualized images, quantity of antennas of the base station and separating data for each antenna;
  measuring parameters of each antenna by data fitting.

In accordance with one or more embodiments, a computer program product is proposed, which comprises a computer readable storage medium having program instructions embodied therewith, the program instructions executable by a processor coupled to a memory, the program instructions executable by the processor to cause operations comprising:
  acquiring a set of images of antennas of a base station;
  processing the set of images with a model based on instance segmentation network, and generating visualized images corresponding to the set of images of antennas;
  calculating, from the visualized images, quantity of antennas of the base station and separating data for each antenna;
  measuring parameters of each antenna by data fitting.

The above features and advantages, and other features and advantages of the disclosure are readily apparent from the following detailed description when taken in connection with the accompanying drawings

BRIEF DESCRIPTION OF THE DRAWINGS

Other features, advantages and details appear, by way of example only, in the following detailed description, the detailed description referring to the drawings in which:

FIGS. 2A-2F depict testing results of an instance segmentation model obtained by adopting Mask R-CNN (instance segmentation network) to train the training set of the database: UAV-Antenna, according to one or more embodiments, where FIGS. 2A-2C are the original antenna images and FIGS. 2D-2F are the segmented antenna images, according to one or more embodiments;

FIG. 10 depicts a process of calculating the quantity of antennas, according to one or more embodiments;

FIGS. 11A-11C depict a process of verifying and separating the number of antennas by different parameters, according to one or more embodiments;

FIG. 12 depicts an exemplary APP terminal interface, according to one or more embodiments;

DETAILED DESCRIPTION

Figure 1:
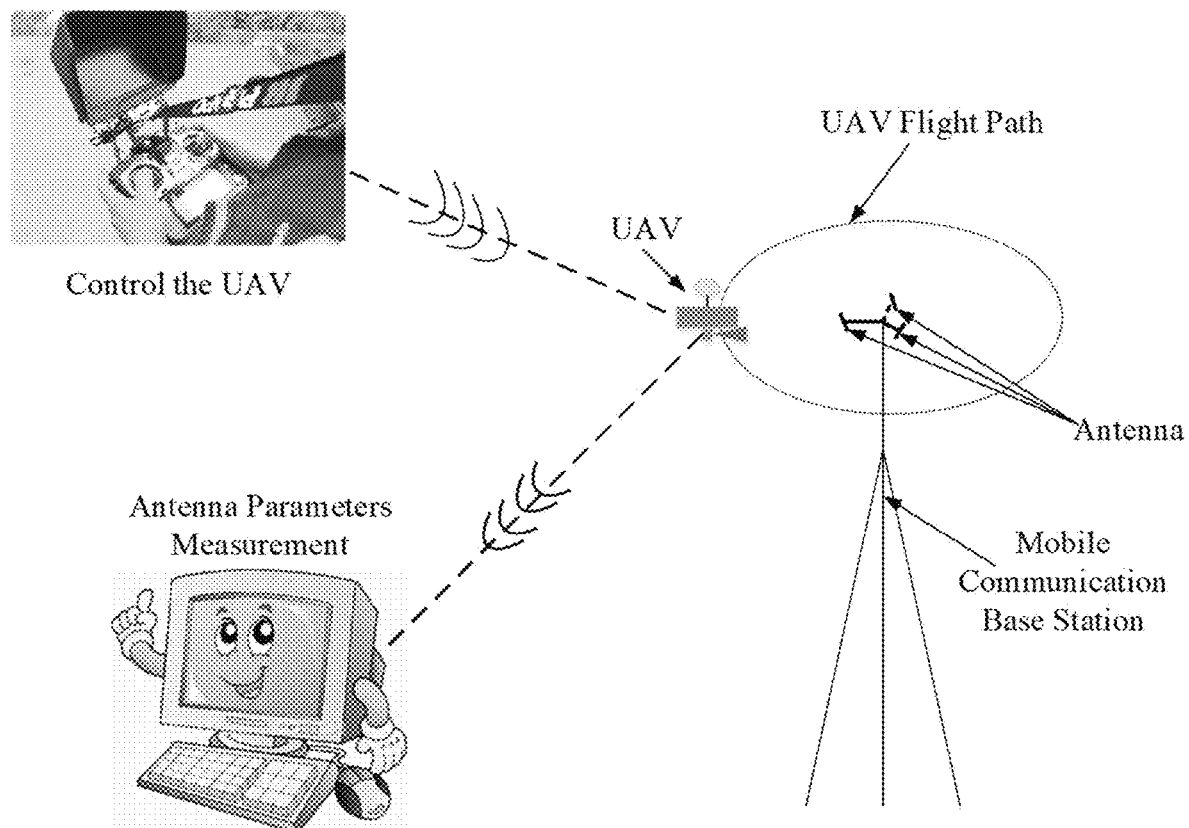
FIG. 1 depicts a schematic diagram of an Antenna Parameters Measurement System Using UAV, according to one or more embodiments.

The present disclosure is merely exemplary in nature and is not intended to be limiting, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable software components or hardware components that provide the described functionality.

The present disclosure presents an automatic antenna parameter measurement method based on deep learning, which consumes little, engages with low hardware requirements and suits for popularization and its performance surpasses all the state-of-the-art methods. The flow chart of proposed method can be referred to FIG. 1.

1. INTRODUCTION

Traditional base station antenna measurement methods conducted with professional worker climbing towers tend to raise safety and inefficiency concerns in practical application. The present disclosure proposes an intelligent and fully automatic method and system of antenna measurement for mobile communication base station, utilizing unmanned aerial vehicle (UAV). Firstly, an antenna database, containing a certain amount of images (for example 19,715 images), named UAV-Antenna is constructed by image capturing with the help of UAVs flying around various base stations. Secondly, Mask R-CNN is adopted to train an optimal instance segmentation model on UAV-Antenna. Then, pixel coordinates and threshold are utilized for measuring antenna quantity and separate all antenna data for further measuring. Finally, a least squares method is employed for measuring antenna parameters. Experimental results show that the proposed method can not only satisfy the industry application standards, but also guarantee safety of labors and efficiency of performance Deep learning method was proposed by Hinton in 2006, and has gradually received attention in massive information processing, image feature extraction and prediction modeling. It is essentially an unsupervised layer-by-layer training method, which uses unlabeled samples for pre-learning, corrects and learns the discriminated features through a small number of labeled samples, that has achieved amazing performance in object detection, segmentation and recognition. What surprised us is that Mask R-CNN proposed by He et al. combined object detection and semantic segmentation, and suggested efficient instance segmentation.

Figures 3A, 3B, 3C:
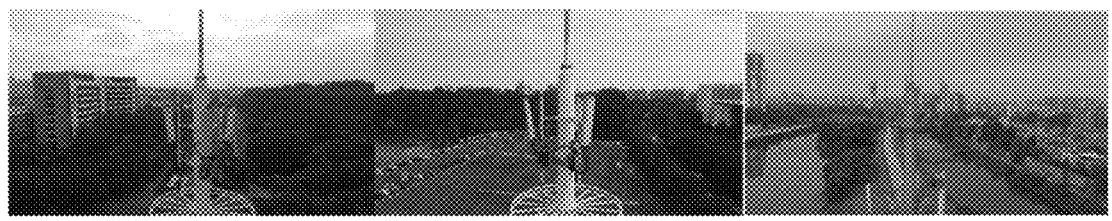
FIGS. 3A-3I show part of training set images, according to one or more embodiments.
Figures 3D, 3E, 3F:
Figures 3G, 3H, 3I:
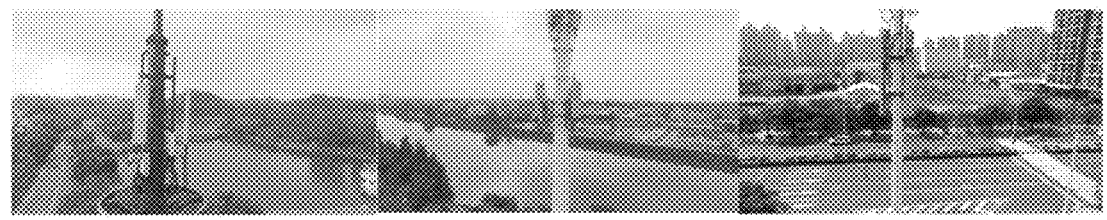

Inspired by the above advancement, the present disclosure presents a mobile communication base station antenna measuring method by using UAV. To begin with, an antenna database named UAV-Antenna is established with, for example 19,715 communication base station images, among which, for example 19,496 are captured by UAVs flying around various base stations while the data in the rest of 219 are adjusted by professional workers manually. Secondly, Mask R-CNN is adopted to train the training set of UAV-Antenna to obtain an optimal instance segmentation model. Optimal model herein means a trained model. The testing results of this optimal model are shown in FIGS. 2A-2F, where FIGS. 2A-2C are the original antenna images and FIGS. 2D-2F are the segmented antenna images. As shown in FIG. 2D, 3 individual antennas are segmented by respective masks 200, 202, 204 in different colors (not shown). As shown in FIGS. 2E-2F, 2 individual antennas are segmented by respective masks 206, 208 in different colors (not shown). Then, pixel coordinates and threshold can be utilized for measuring antenna quantity and separate all antenna data for further measuring. Finally, a least squares method is employed for measuring antenna parameters.

2. RELATED WORKS

2.1 UAV

UAVs are unmanned aerial vehicles operated by radio remote control equipment and self-contained program control devices. In recent years, industries in mounting number begin to utilize UAVs instead of traditional labors. For instance, agriculture uses UAVs for fertilization, industry for inspections, and the film and television industry for aerial photography, special effects and so forth. Fernandez et al. [3] introduced the capability of using small low cost UAV system to measure and diagnose field antennas. Shakhatreh et al. [4] conducted a survey on the civilian application of UAV and the challenges that human is facing. Nonetheless, in the measurement of mobile communication base station antennas, the use of only UAVs may immensely increase the hardware cost and the flying time of UAVs may be greatly shortened with their ascending weight. Therefore, introducing machine vision with the assistance of UAV to measure antenna parameters is expected to be a better solution.

2.2 Object Detection

Object detection, as one of the research tasks of machine vision, aims to identify all the objects of interest in images, precisely locate and classify them. It is one of the core issues in the field of computer vision that has received extensive attention in many fields such as industry, agriculture, and manufacturing. Girshick et al. [5] certified a region-based fast convolutional network object detection method, with the use of a deep convolution network to effectively classify object candidate regions. Liu et al. [6] validated a method for detecting objects in an image using a single deep neural network, which discretizes the output space of bounding box into a set of default boxes, each of which has different scales and proportions. When forecasting, the network generates a score for each object category in each default box and adjusts the box to better match object shape. Redmon et al. [7] originated a method of object detection, shifting the perspective from the problem of object detection to the problem of spatially separated bounding box and related class probability regression. Ren et al. [8] introduced a more advanced object detection network that relies on a candidate region algorithm to assume an object location. Region Proposal Network (RPN) also is presented, which shares a full image convolution features with the detection network to generate nearly free candidate regions. However, object detection can only detect antenna but cannot measure antenna parameters. Consequently, it is hoped that the relationship between pixel and antenna parameters can be favorably identified via introducing semantic segmentation.

2.3 Semantic Segmentation

Semantic segmentation is a pixel-level classification of the target images. Its function is to separate the categories of individual objects in an image with multiple objects and draw their positions. Different colors are used to represent different categories. But in this way, it is of impossibility to subdivide the same type of object. Semantic segmentation has been widely applied in the fields of geographic information systems, unmanned vehicle driving, medical image analysis, and robotics. Chen et al. [9] introduced a model for improving segmentation results by adding a simple and efficient decoder module that applies depth separable convolution to spatial pyramid pools and decoder modules so as to form faster and stronger encoder-decoder network. Wang et al. [10] raised a method to improve pixel-level semantic segmentation by manipulating convolution-related operations. This method creates a dense up-sampling convolution to generate pixel-level predictions, which captures and decodes more detailed information that is usually omitted in bilinear up-sampling. Moreover, a hybrid expansion convolutional framework is proposed at the coding stage. The receiving domain of the network is expanded to aggregate global information. Chen et al. [11] suggested the use of convolution of upsampling filters to achieve dense prediction tasks, and a shrinking spatial pyramid pool for robust segmentation of objects on multiple scales. Long et al. [12] proposed a method to establish a full convolutional network, which inputs objects of any size and outputs a correspondingly sized outcome by effective reasoning learning.

Furthermore, it transforms the widely used classification network (AlexNet, VGG net, and GoogLeNet) into a full convolutional network, and continues defining a mobile framework that will combines semantic information from deep layers with appearance information from shallow layers to produce accurate and detailed segmentation. After semantic segmentation, the relationship between antenna parameters and pixel points can be easily acknowledged. As for the specific parameter value of antenna, linear fitting method is utilized to quantize antenna parameters which can readily address this problem.

2.4 Linear Fitting

Linear fitting refers to the functional relationship between a continuous curve and a coordinate represented by a discrete set of points on a same plane. More broadly, the corresponding problem in space or high-dimensional space also falls into this category. In the process of numerical analysis, linear fitting is the use of analytical expressions to fit discrete data points. Linear fitting, as a common method in mathematical calculations, has been applied in architecture, physics, chemistry, and even artificial intelligence.

By now, no predecessor has ever combined object detection, semantic segmentation and linear fitting in antenna parameter measurement. For the first time, the present disclosure validates a fully automatic antenna parameter measurement method based on instance segmentation, least squares, frame sequence analysis and UAV, which enjoys remarkable preciseness, rapid recognition and outstanding performance.

3. UAV-ANTENNA DATABASE

According to one or more embodiments of the present disclosure, an antenna database named UAV-Antenna is established in order to improve the instance segmentation accuracy of mobile communication base station antenna and pixel-level antenna parameters quantization accuracy in different environments, for instance, low light situation, complex background and so forth. This antenna database consists of, for example 19,715 images, captured with UAVs flying around various base stations. These images may contain a training set of 19,496 images and a testing set of 219 images. Among them, the labels of testing set were manually adjusted by professional workers to be compared with the results obtained via the methods proposed in the present disclosure.

3.1 Data Capturing

According to one or more embodiments of the present disclosure, in the data capturing phase, two UAVs were used to fly around the mobile communication base station with various background complexity in different time periods, for instance morning, noon and evening, and obtained video data of base station through HD cameras provided on UAVs. In the method and system according to one or more embodiments of the present disclosure, the flight parameters of UAVs can be controlled as follows:

(1) When flying around the mobile communication base station, the UAVs' flying height must be the same as the height of center position of antenna of communication base station to avoid inaccurate pixel-level quantization of antenna parameters due to the inconsistency of view.

(2) the UAVs' flying radius is adjusted as 5 to 6 meters to ensure the appearance of the base station in the field of view and the visibility of antenna outline to improve the detection accuracy of the proposed method.

(3) The angular velocity of the UAVs stands at 3 degree/s, ensuring every frame in the video clear enough to be detected.

3.2 Data Processing

According to one or more embodiments of the present disclosure, in the data processing phase, with the video data of communication base station collected during the data capturing phase, interval frame sampling process is conducted and each image obtained from the data capturing phase has at least one antenna that can be detected. The database consists of images from diverse base stations with various environments and background complexity to ensure the accuracy and universality of the optimal model. It turns out that 19,496 antenna images are sampled to form the training set of UAV-Antenna. Part of training set images are shown in FIGS. 3A-3I.

3.3 Data Labeling

According to one or more embodiments of the present disclosure, training set images are marked in data labeling stage. Specific steps are presented as follows: First and foremost, VGG Image Annotator is used to mark antenna outline on the front, side and front side of the antennas in each image, with name tag read "antenna". After all of the 19496 images have been marked, a json file suitable for training of Mask R-CNN is generated and placed in the training set to have the same pathas training images.

4. PROPOSED AUTOMATIC ANTENNA PARAMETERS MEASURING METHOD

As desired to improve at least some of the disadvantages of traditional manual measurement of mobile communication base station antenna parameters, for instance low efficiency, high mortality and other measurement difficulties, the present disclosure pioneered with an intelligent and fully automatic antenna measurement method using UAV system for mobile communication base station, which unites the instance segmentation algorithm-Mask R-CNN, linear fitting, frame sequence analysis and UAV to realize antenna parameters pixel-level measurement. The following part proves to specify this method: Above all, an antenna database named UAV-Antenna containing 19,715 communication base station images is constructed by image capturing with UAVs flying around various base stations. Secondly, Mask R-CNN is adopted to train an optimal instance segmentation model on UAV-Antenna database. Then, pixel coordinates and threshold are utilized for calculating antenna quantity and separate all antenna data for further measuring. Eventually, least squares method is employed for measuring antenna parameters. Experimental results show that the proposed method outperforms methods of measuring antenna parameters with practical hardware. Additionally, antenna parameters measured by the method according to one or more embodiments share almost no difference from the manual measurement results, which complies with industry standards.

4.1 Segmentation Based on Mask R-CNN

Figure 4:
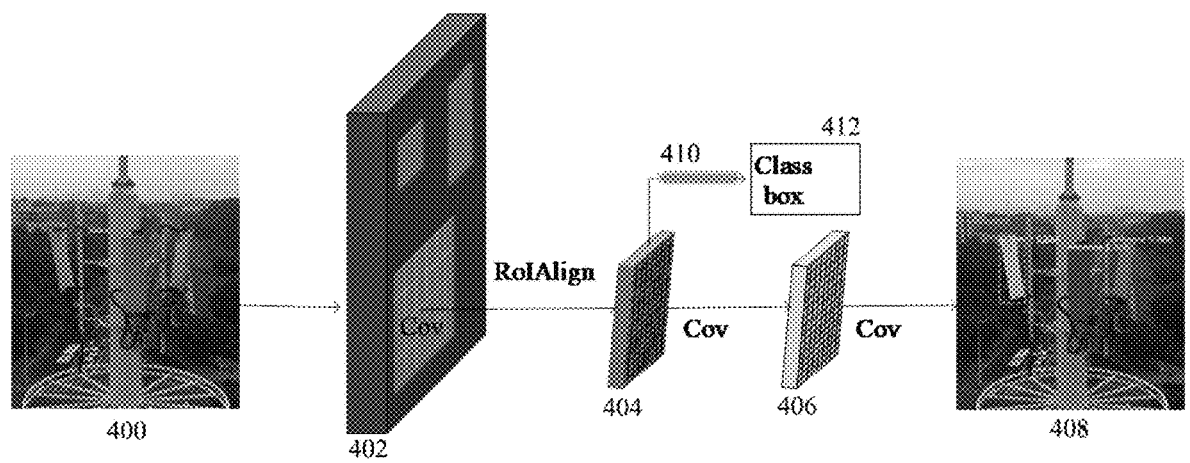
FIG. 4 depicts a basic framework of Mask R-CNN, according to one or more embodiments, with an input image, and an output image in which the antennas are segmented by masks.

According to one or more embodiments of the present disclosure, Mask R-CNN is the representative for instance segmentation, or referred to as instance segmentation network. After inputting an image into the network, it can output an existing object with a high quality mask which is generated for each instance. With the basic framework of Mask R-CNN 402 displayed in FIG. 4, we can see that it consists of three core groups: the backbone network, the full convolution network, and the region of interest alignment (ROI Align). The backbone network aims to achieve object detection and classification while the full convolutional network is designed to add a mask to the detected object. As for ROI Align, it uses bilinear interpolation to replace traditional quantization operation to reduce error. For example, an original image 400, which is one of frame images from a video is input to Mask R-CNN 402, after processing such as convolution, ROI align 406, 404 (which may contain classification 412), an processed image 408 is output.

4.1.1 Backbone Network

Figure 5:
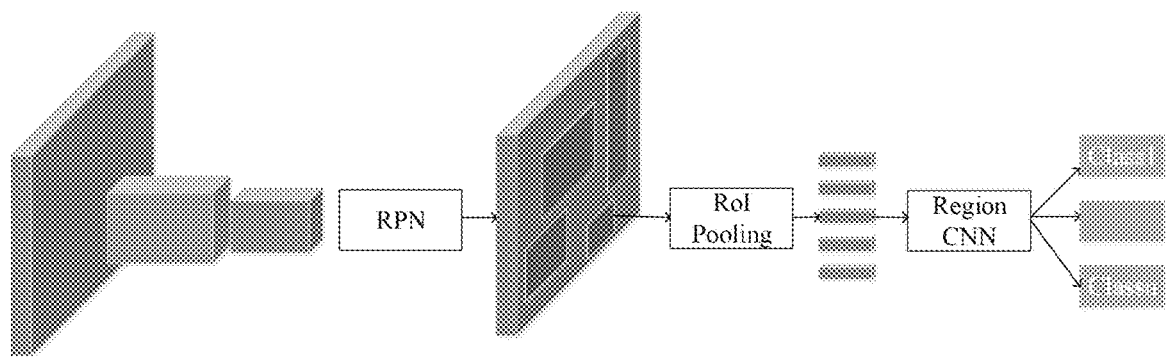
FIG. 5 depicts a backbone of network of instance segmentation algorithm, according to one or more embodiments.

According to one or more embodiments of the present disclosure, Mask R-CNN refers to one of the basic algorithms for object detection, whose backbone network structure is shown in FIG. 5. As known, there are four key modules of object detection, including feature extraction network, generation of regions of interest (ROI), classification of ROI, and regression of ROI. The backbone network uses a neural network to combine these four parts to form an end-to-end network. The feature extraction network intends to extract some important features of different objects from a large number of pictures, which are generally composed of convolution, pooling and activation functions. Its result is called feature map. Generating ROI is to produce multiple candidates ROI of the obtained feature map, and use the classifier to divide ROI into backgrounds and foregrounds; at the same time, the position of these ROI is initially adjusted using a regression instrument. The ROI classification contributes to distinguishing between foreground and background in the region proposal network (RPN) phase while ROI regression works to make initial adjustments in RPN and to make precise adjustments during the regional convolutional neural network phase.

The backbone network devotes to proposing pooling technology of ROI and RPN. RPN enhances detection accuracy while promoting the speed. The role of ROI pooling technique is to fix ROI on feature map to a specific size (7×7) by maximum pooling operation for subsequent classification and bounding box regression operations.

However, since the location of pre-selected ROI is usually obtained by model regression, which is generally a floating point number, ROI pooling technique possesses two processes of data quantification. After the above two quantization operations, there is a certain deviation between the quantified ROI and the original ROI, and this deviation will affect the accuracy of the object detection. RPN is used to distinguish and initially locate multiple ROI generated on feature map. It is robustly implemented in a full convolution manner, using the convolutional feature map returned by the underlying network as input, as well as a convolutional layer with n channels and a 3×3 convolution size and two parallel 1×1 convolution kernels, in which the quantity of channels n shows positive correlation with the number of anchors. At the same time, in the classification layer, the predicted values of the background and objects are outputs for each anchor.

4.1.2 Full Convolutional Network (FCN)

Figure 6:
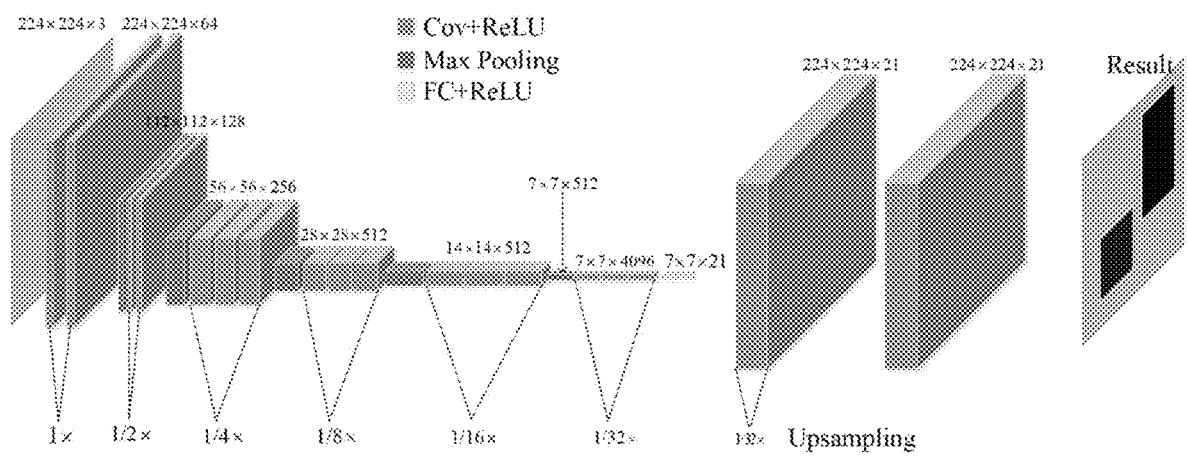
FIG. 6 depicts a framework of FCN, according to one or more embodiments.

According to one or more embodiments of the present disclosure, FCN is a classic network in semantic segmentation, which can accurately segment objects in images. The network framework is manifested in FIG. 6 which indicates an end-to-end network. FCN classifies images in pixel-to-pixel manner, thus solving the problem of image segmentation (semantic segmentation) at the semantic level. Varied from the classic CNN after convolutional layer using fully connected layer to obtain fixed-length feature vectors for classification (FC layer+softmax), FCN can accept input images of any size, using the deconvolution layer after last convolution layer to upsample the feature map of the last convolutional layer to restore it to the same size as the input image, so that a prediction can be generated for each pixel while preserving the spatial information in the original input image. Finally, pixel-by-pixel classification is performed on the upsampled feature map and the loss of softmax classification is calculated.

4.1.3 ROI Align

Figure 7:
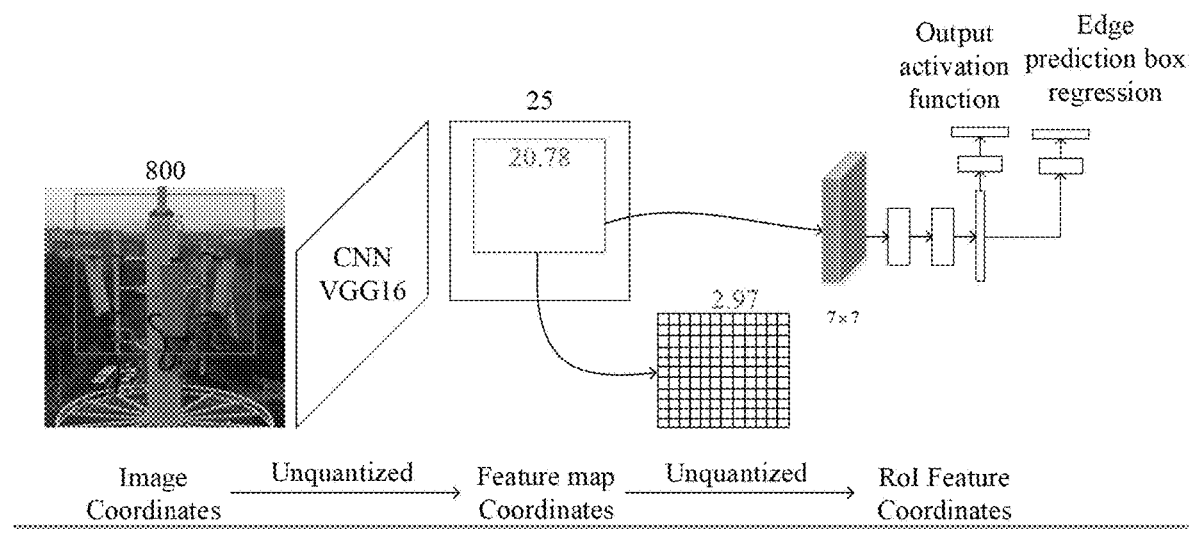
FIG. 7 depicts a process of region of interest alignment, according to one or more embodiments.

Traditional detection framework makes use of ROI Pooling, which pools the corresponding area into a fixed-size feature map in the feature map according to the position coordinates of pre-selected frame for subsequent classification and bounding box regression operations. Since the position of the pre-selected box is usually generated by regression of model, it is generally a floating point number. Unfortunately, the pooled feature map requires a fixed size. Therefore, the operation of ROI Pooling is equipped with two quantification processes. One is that candidate box boundaries are quantized to integer point coordinate values. The other is that quantized boundary regions are equally divided into k×k bins, and then the boundaries of each cell are quantized. However, after two quantifications, the candidate box has a certain error from the initial position, which affects the accuracy of detection or segmentation. ROI Alignment technique, instead of using the quantization operation in the pool of ROI, employs linear interpolation method whose main purpose is to avoid errors caused by quantization operations. The details of this process are expressed in FIG. 7. In order to obtain a stable size (7×7) feature map, ROI alignment technique uses a bilinear interpolation algorithm to process floating point numbers. Bilinear interpolation is a better image scaling algorithm, which fully utilizes four real pixel values around virtual point in the original image to jointly determine a pixel value in target image. This operation can make pixels in the original image and pixels in the feature map completely aligned, without deviation, which not only augments the accuracy of detection, but also facilitates instance segmentation.

4.2 Linear Fitting Based on Least Squares

Least squares method is a mathematical optimization method that finds the best function match of data by minimizing the sum of the squares of errors. Unknown data can be easily obtained by least squares method, which minimizes the sum of the squares of errors between solved data and actual data and can be used to fit the curve. According to one or more embodiments of the present disclosure, least squares method is introduced to optimize the coordinates of the leftmost and rightmost pixel points of the mask generated by Mask R-CNN, fitting curve and coefficient of the best performance, so as to improve the measurement accuracy of antenna parameters, for instance, down-tilt angle. But for the other parameters, the quantization of pixel-level mask can readily meet the need. For example, the area of antenna can be obtained by multiplying the width of antenna mask by the height, and the aspect ratio of antenna can be obtained by dividing the width of antenna mask by the height. Steps of measuring the down-tilt angle of the antenna by least square method are elaborated in the following part. Let the expression of the line equation be, $$y = a + bx \quad (1)$$

The best a and b are obtained from the set of pixel points on the right edge of the mask antenna generated by the optimal model. For a couple of pixel point coordinates $(x_i, y_i)$ that satisfy the linear relationship, assumes that the error of the coordinate $x_i$ of the x-axis of the pixel is negligible. Then under the same $x_i$ the error $d_i$ of $y_i$ and $a+bx_i$ is as follows, $$d_n = y_n - a - bx_n \; (n = 1, 2, 3L) \quad (2)$$

Due to the fact that optimal model trained by Mask R-CNN cannot reach the extent that all antennas can be detected, and the detected antennas cannot guarantee full padding during the process of adding mask, the set of pixels on the right edge of the mask is generally not in a straight line. In this way, we can only consider $d_1+d_2+L+d_n$ as the minimum, but because $d_1, d_2, L, d_n$ has positive and negative numbers, adding will cancel each other out, Hence, an equivalent method can be taken to eliminate this impact, which is when $d_1^2+d_2^2+L+d_n^2$ appears to be the minimum value, $d_1, d_2, L, d_n$ must be the minimum value.

$$D = \sum_{i=1}^{n} d_i^2 = \sum_{i=1}^{n} [y_i - a - b_i]^2 \quad (3)$$

D finds the first-order partial derivative of a and b respectively, $$\frac{\partial D}{\partial b} = -2 \left[ \sum_{i=1}^{n} x_i y_i - a \sum_{i=1}^{n} x_1 - b \sum_{i=1}^{n} x_i^2 \right] \quad (4)$$

Find the second-order partial derivative, $$\frac{\partial^2 D}{\partial b^2} = 2 \sum_{i=1}^{n} x_i^2 \quad (5)$$

Obviously, $$\frac{\partial^2 D}{\partial a^2} = 2n \geq 0; \; \frac{\partial^2 D}{\partial b^2} = 2 \sum_{i=1}^{n} x_i^2 \geq 0,$$

Satisfy the minimum condition, so setting the first-order partial derivative is 0.

$$\sum_{i=1}^{n} x_i y_i - a \sum_{i=1}^{n} x_i - b \sum_{i=1}^{n} x_i^2 = 0 \quad (6)$$

Average value has been introduced, $$\overline{xy} = \frac{1}{n} \sum_{i=1}^{n} x_i y_i \quad (7)$$

Then getting the result, $$a = \overline{y} - b\overline{x} \quad (8)$$

$$b = \frac{\overline{xy} - \overline{x}\overline{y}}{\overline{x^2} - \overline{x}^2} \quad (9)$$

The values of a and b are substituted into the linear equation $y=a+bx$ to obtain a linear regression equation. And calculate the antenna down-tilt angle according to the value of b, Let the antenna down-tilt angle $\omega_r$ fitted by the set of pixels on the right edge of the mask. So there is an equation related $\omega_r$, $$\omega_r = \arctan |b| \quad (10)$$

In order to reduce the error caused by fitting curve of the right edge pixel point, the present disclosure introduces a set of pixels which are the left edge of the full side antenna mask. For the same reason, $\omega_l$ is the down-tilt angle which can be obtained by the left edge pixels of the full side antenna mask.

$$\omega_l = \arctan |b \cdot| \quad (11)$$

Therefore, there is a mobile communication base station antenna down-tilt angle which can be expressed as $\omega$ $$\omega = \frac{\omega_r + \omega_l}{2} \quad (12)$$

Figure 8:
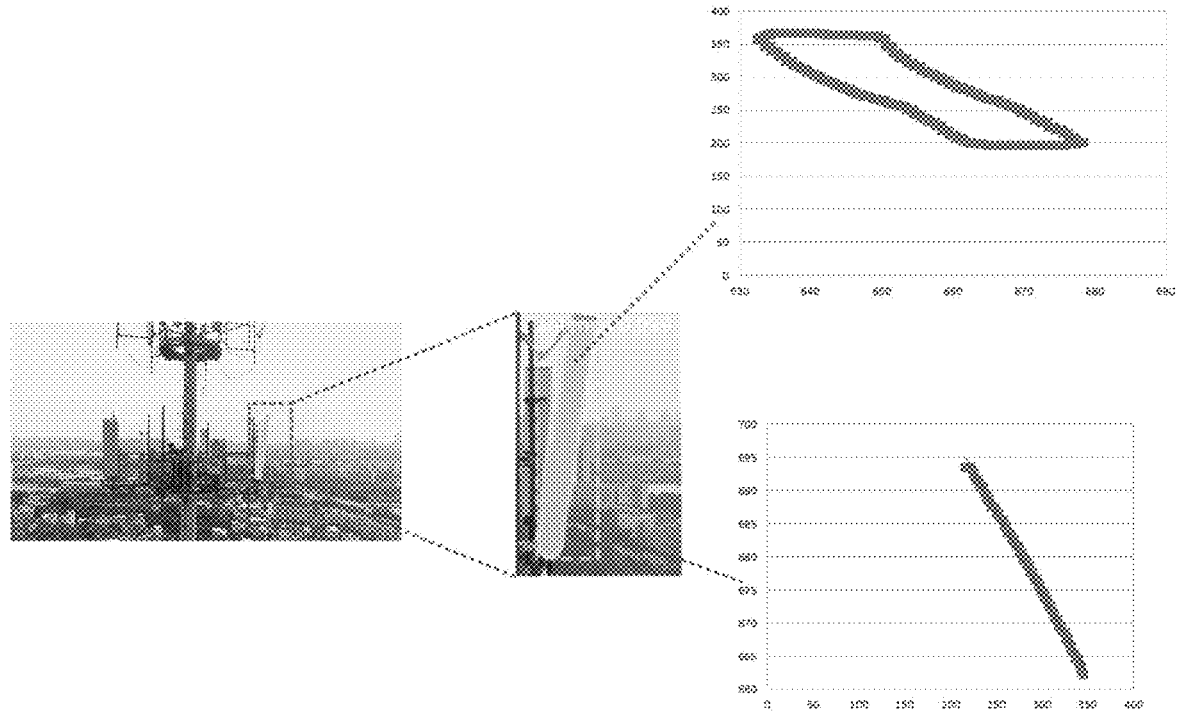
FIG. 8 depicts a process of fitting the antenna down-tilt angle in the method of antenna parameters measurement, according to one or more embodiments.

The process of the method which combined least squares and Mask R-CNN in antenna parameter measurement is presented in FIG. 8. The upper image is the curve fitted by all the edge pixels of the antenna mask while the bottom one is the curve fitted to the pixel edge on the right edge of the antenna mask.

4.3 Automatic Fitting and Measuring

Semi-automatic antenna parameters measurement is based on Mask R-CNN, least squares and UAVs. The difference between fully automatic method and semi-automatic method lies in that, the fully automatic method according to the present disclosure can automatically proceed video framing, determining quantity of antennas, finding side antenna image and outputting their parameters. In this process, pixel coordinates and thresholds are utilized for measuring antenna quantity and separate all antenna data thereby achieving fully automatic antenna parameters measurement. The automatic antenna parameters measuring algorithm details are shown as below.

Figure 9:
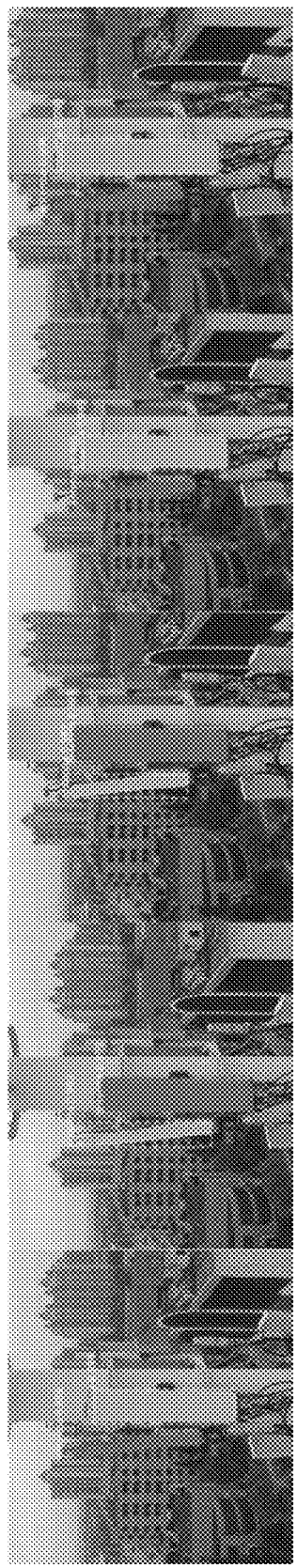
FIG. 9 shows recognition results of 5 Consecutive frames from UAV Antenna Video, according to one or more embodiments.

According to the requirements of UAVs flying around antennas mentioned in Session 3.1, Firstly, a complete video of base station antenna taken by UAV is used as the input of the proposed method; Secondly, the video is framed according to the requirements of 15 frames per second and each frame of antenna image is saved together. Then, these original images are input to the optimal model which is trained by Mask R-CNN (instance segmentation network) on UAV-Antenna, after which it outputs images with antenna mask which are shown in FIG. 9.

Exemplary method of Automatic Antenna Parameters Measuring using UAV:

Input: Video data A of base station through HD cameras provided on UAVs output: The quantity n of antenna and the parameters p of each antenna Step 1. Framing Video data A into testing set a at f frames per second, images in a are sorted in chronological order; exemplary, according to some experimental results, f can be set as 15;

Step 2. Testing the testing set a by the optimal model trained by Mask R-CNN (instance segmentation network), and generating visualized images in which antennas are segmented with respective masks;

Step 3. Outputting pixel coordinates of the upper right corner of all masked antennas, wherein pixel interval y and threshold t are utilized to calculate the quantity n of antenna; exemplary, according to some experimental results, y can be set as 50, t can be set as 400;

Step 4. Finding the side of an antenna based on the largest area of antenna, then output antenna down-tilt according to least squares method via equation (1)-(12);

Step 5. Outputting the quantity n of antenna and the parameters vector p, including down-tilt angle area, aspect ratio, direction angle of each antenna.

In Step 3, as shown in FIG. 9, these antenna images with masks are analyzed, assuming that shifting of pixel coordinates of an antenna do not exceed 50 pixels in two frames forward and backward, then the antennas in the two frames can be considered as one same antenna. Conversely, two different antennas are recorded. Due to a circumstance of dearth of training samples, the method proposed in the present disclosure may mistakenly detect non-antenna objects as antennas, leading to false detection. In order to reduce the impact of the false detection, the present disclosure sets the threshold of the effective frame sequence length at 400 for an individual antenna, which is the empirical value obtained after many experiments. When the antenna effective frame sequence length is greater than 400, the detected antenna is considered to be a real antenna; otherwise, a false detection caused by other objects in the background like buildings. The whole process is expressly demonstrated in FIG. 10.

In Step 4, to find the side of an segmented antenna, finding an image containing the antenna presenting the largest area thereof, from the visual images, thereby detecting the front of the antenna; then locating an image, from the testing set, with equivalent 90 degree of UAV flying to the left or to the right, thereby finding the image which includes the side of the antenna.

Motivated by the above advancement, data fitting is performed on antenna down-tilt angle, the area of antenna mask, and the aspect ratio of antenna mask to verify and separate the number of antennas in all output images which is shown in FIGS. 11A-11C. At the same time, the parameters which include down-tilt, area, aspect ratio, direction angle (can be provided by the UAV) and GPS are displayed on an exemplary APP terminal interface of all antennas of the mobile communication base station. FIG. 12 can be referred to the whole APP terminal interface.

Figure 13:
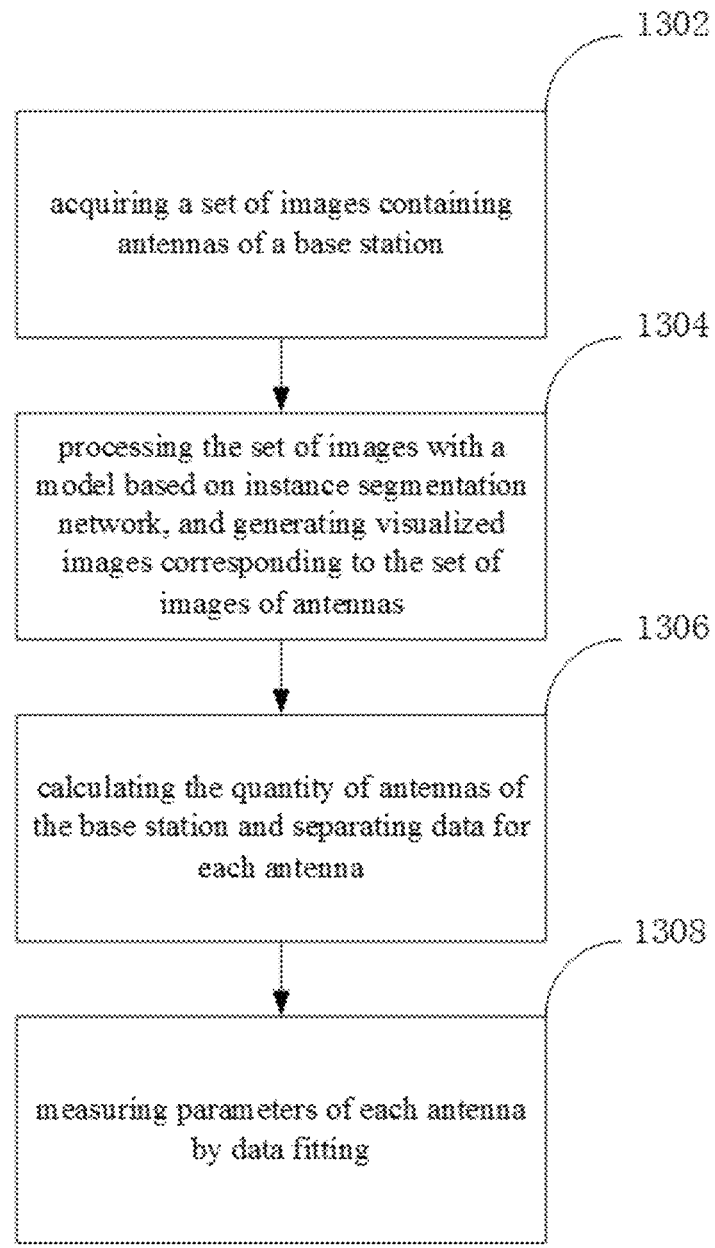
FIG. 13 depicts a flow chart of the method for mobile communication base station antenna measurement according to one or more embodiments.

According to one or more embodiments of the present disclosure, as shown in FIG. 13, a method for mobile communication base station antenna measurement is disclosed, comprising steps of, wherein:

At step 1302, acquiring a set of images containing antennas of a base station;

At step 1304, processing the set of images with a model based on instance segmentation network, and generating visualized images corresponding to the set of images of antennas; wherein the model is trained by instance segmentation network;

At step 1306, calculating, from the visualized images, the quantity of antennas of the base station and separating data for each antenna;

At step 1308, measuring parameters of each antenna by data fitting.

According to one or more embodiments of the present disclosure, wherein the step 1302 of acquiring of the set of images comprises:

capturing a video data of the antennas by at least one UAV flying around a base station;

framing the video data into the set of images, at a reduced frame rate to the video data, or at a frame rate not greater than that of the video data.

According to one or more embodiments of the present disclosure, wherein the generating of visualized images of step 1304 comprises:

detecting all antennas of the base station in the set of images;

segmenting each antenna with individual antenna mask.

According to one or more embodiments of the present disclosure, wherein the step 1306 of calculating and separating comprises: utilizing pixel coordinates and a threshold to measure the quantity of antennas and separate data for each antenna.

According to one or more embodiments of the present disclosure, wherein the measuring of parameters comprises:

performing data fitting on at least one of following: antenna down-tilt angle, area of antenna mask, and aspect ratio of antenna mask to verify and separate each antenna in the visualized images.

According to one or more embodiments of the present disclosure, wherein the calculating comprises:

obtaining pixel coordinates of an upper right corner of each masked antenna;

calculating the quantity of antennas based on a pixel interval and a threshold.

According to one or more embodiments of the present disclosure, wherein the parameters comprises at least one of following, of each antenna: down-tilt angle, area, aspect ratio, direction angle.

According to one or more embodiments of the present disclosure, wherein the measuring of parameters comprises:

finding, from an individual antenna mask, a side of an antenna based on a largest area of the antenna, measuring a down-tilt angle of the antenna by employing linear fitting.

According to one or more embodiments of the present disclosure, wherein the measuring of down-tilt angle comprises:

obtaining, via linear fitting based on least squares, a fitting of either right edge pixels or left edge pixels of the side of an antenna as presented by the individual antenna mask;

measuring a down-tilt angle of the antenna according to the fitting data.

According to one or more embodiments of the present disclosure, wherein the measuring of down-tilt angle comprises:

obtaining, via linear fitting based on least squares, fitting of both right edge pixels and left edge pixels of the side of an antenna as presented by an individual antenna mask;

measuring a down-tilt angle of the antenna according to an averaging on the fittings of the right edge pixels and left edge pixels.

According to one or more embodiments of the present disclosure, wherein the instance segmentation network comprises: backbone network, full convolution network, and region of interest alignment.

Figure 14:
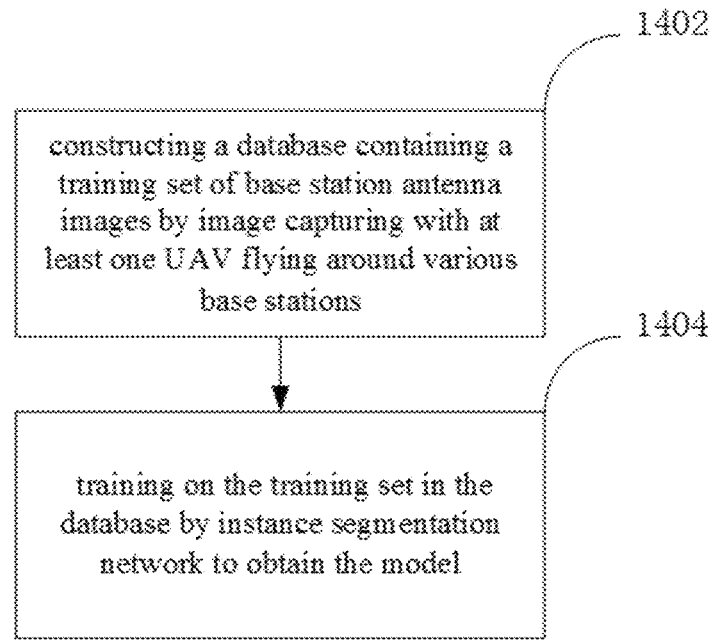
FIG. 14 depicts a the process of constructing a database of base station antenna images and training the database, according to one or more embodiments.

According to one or more embodiments of the present disclosure, as shown in FIG. 14, the method further comprises steps of, wherein:

At step 1402, constructing a database containing a training set of base station antenna images by image capturing with at least one UAV flying around various base stations;

At step 1404, training on the training set in the database by instance segmentation network to obtain the model.

According to one or more embodiments of the present disclosure, after step 1404, the method can go to step 1302.

Figure 15:
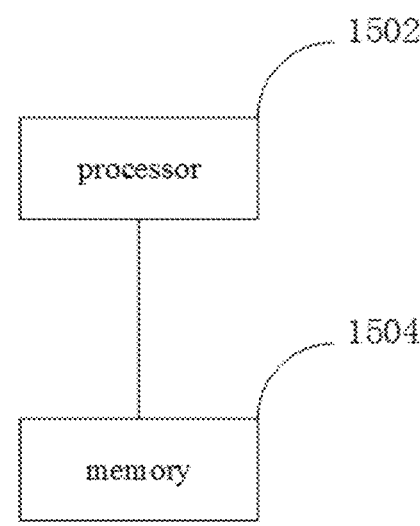
FIG. 15 depicts a block diagram of the system according to one or more embodiments.

According to one or more embodiments of the present disclosure, as shown in FIG. 15, a system for mobile communication base station antenna measurement is disclosed, comprising a processor 1502 and a memory 1504 storing program instructions thereon, the program instructions executable by the processor 1502 to cause the system to perform:

acquiring a set of images of antennas of one base station;

processing the set of images with a model based on instance segmentation network, and generating visualized images corresponding to the set of images of antennas;

calculating, from the visualized images, the quantity of antennas of the base station and separating data for each antenna;

measuring parameters of each antenna by data fitting.

According to one or more embodiments of the present disclosure, a computer program product is disclosed, comprising a computer readable storage medium having program instructions embodied therewith, the program instructions executable by, for example, the processor 1502 coupled to the memory 1504, or by another processor(s) coupled to another memory, the program instructions executable by the processor to cause operations comprising:

acquiring a set of images of antennas of a base station;

processing the set of images with a model based on instance segmentation network, and generating visualized images corresponding to the set of images of antennas;

calculating, from the visualized images, the quantity of antennas of the base station and separating data for each antenna;

measuring parameters of each antenna by data fitting.

5 EXPERIMENTAL RESULTS AND ANALYSIS

5.1 Experimental Parameter Setting

The computer used in experiments can be configured with, for example, Xeon E3 CPU, NVIDIA GeForce GTX 1080, and 64G memory. The experiments were carried out with ubuntu16.04 operating system, CUDA Toolkit 8.0, and Tensorflow framework. Specific distribution of UAV-Antenna is shown in Table 1. Angles (1', 4', 5', 6', 7', 8, 9', 12', 15') of antennas in the testing set were adjusted by professional workers.

TABLE 1

Specific Distribution of UAV-Antenna

| Training Set (unlabeled) | Test Set (down-tilt angle label distribution) | | | | | | | | |
|---|---|---|---|---|---|---|---|---|---|
| | 1° | 4° | 5° | 6° | 7° | 8° | 9° | 12° | 15° |
| 19496 | 13 | 25 | 22 | 30 | 25 | 23 | 22 | 39 | 20 |

5.2 Experimental Results

In order to verify the accuracy of proposed antenna parameters measurement method, experiments were conducted on training set with 19,496 unlabeled images and tested on testing set with 219 labeled images. After experimental comparison, when learning rate is set at 0.001 and threshold is set at 0.85, the objects detection performed best. Under the premise that learning rate and threshold are unchanged, several experiments are conducted, and detection accuracy, fitting accuracy and time via optimizing parameters such as epochs, training layers are defined, as shown in Table 2. Detection accuracy indicates detection rate of all antennas (except the back antenna) in testing set, while fitting accuracy represents ratio of antennas that match the industry standard to the detected antenna, and time is expressed as the time of detecting and fitting parameters (down-tilt angle, area, aspect ratio). By comparing time, detection accuracy and fitting accuracy, optimal model is spotted whose detection accuracy is 99.4%, fitting accuracy is 58.2% and time is 5.95 s.

TABLE 2

Performance Comparison of Testing on Various Parameters

| Epochs | Layers | | Detection Accuracy | Fitting Accuracy | Time(s) |
|---|---|---|---|---|---|
| | All | Heads | | | |
| 30 | Y | N | 99.3% | 46.4% | 6.05 |
| 30 | N | Y | 77.2% | 36.2% | 6.42 |
| 40 | Y | N | 99.4% | 48.1% | 6.00 |
| 40 | N | Y | 86.7% | 29.7% | 5.95 |
| 50 | Y | N | 99.4% | 58.2% | 5.95 |
| 50 | N | Y | 90.2% | 47.4% | 6.31 |

By comparison, when epochs are set at 50 and layers are controlled at all, the best experimental results can be obtained in terms of detection accuracy, fitting accuracy and time. Hence, the present disclosure selects this model with the best performance to measure antenna images at various angles in the testing set. The results can be observed in Table 3. Among them, the deviation angle is the absolute value of the measurement result and the actual angle. It can be known from the deviation angle that the accuracy of mobile communication base station antenna parameters measurement result of the optimal model ranks the top.

TABLE 3

| Antenna Angle Measurement Result of Test Set | | | | | | | | | |
|---|---|---|---|---|---|---|---|---|---|
| Actual angle | 1 | 4 | 5 | 6 | 7 | 8 | 9 | 12 | 15 |
| Measure angle | 2.34 | 3.50 | 5.16 | 5.46 | 6.01 | 7.39 | 8.77 | 10.60 | 13.91 |
| deviation | 1.34 | 0.50 | 0.16 | 0.54 | 0.99 | 0.61 | 0.23 | 1.40 | 1.09 |

In the present disclosure, UAV-Antenna database is compared against the widely used YOLOv3, Faster R-CNN and Mask R-CNN. Table 4 shows their detection accuracy respectively. Data conclude that Mask R-CNN achieves the best results: 99.44% MAP. Mask R-CNN has less localization error, indicating that Mask R-CNN can localize objects better in terms of antennas detection task.

TABLE 4

| Performance Comparison of Object Detection Accuracy | |
|---|---|
| Method | Detection Accuracy |
| YOLOv3[5] | 92.72% |
| Faster R-CNN[6] | 89.85% |
| Mask R-CNN[13] | 99.44% |

Thus, using Mask R-CNN to detect the antenna of mobile communication base station proves to be the best choice. FIGS. 2A-2F are the test results of testing antenna images using the proposed method. The upper images are the original images, while the bottom images are the visualized images obtained from optimal model. The classification results of antennas and accuracy of bounding box are displayed in the visualization images.

6 CONCLUSION

An intelligent and fully automatic antenna parameters measurement method is successfully proposed using UAVs for mobile communication base station. The method according to one or more embodiments emphasizes the united collaboration of Mask R-CNN, least squares, frame sequence analysis and UAV to fully automatically measure antenna parameters, skillfully realizing multifield cooperation of software and hardware. It can be experimentally validated that the appropriate training strategies employed can achieve outstanding performance in fully automatic antenna parameters measurement. Compared with traditional method and the most advanced methods including YOLOv3 and faster R-CNN which have been trained and tested on UAV-Antenna database constructed by image capturing with the help of UAVs flying around various base stations in antenna parameter measurement, the method according to one or more embodiments significantly excels in its features as low cost, low dependence on hardware methods and easiness in application. In addition, the innovated proposed method has filled the blank in the field of previous antenna parameters measurement methods using algorithms coupled with UAV. Simultaneously, it produces markedly superior measurement efficiency and satisfactory safety control.

The method and system according to one or more embodiments of the present disclosure, apart from its standalone utility, provides a useful solution for mobile communication base station antenna parameters measurement. It stands an extraordinarily promising future for it is a constructive system which uses CNN to detect antennas and measure its parameters in more complex scenarios or any other low-altitude object detection and parameters measurement in video simultaneously.

The present disclosure may be a system, a method, and/or a computer readable storage medium. The computer readable storage medium may include computer readable program instructions thereon for causing a processor to carry out aspects of the present disclosure.

Steps shown in the flowchart of the drawings may be executed, for example, in a computer system containing a group of computer executable instructions. Although a logical sequence is shown in the flowchart, in some cases, the shown or described steps may be executed in a different sequence herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

REFERENCE

[1] Geise A, Neitz O, Migl J, et al. A Crane Based Portable Antenna Measurement System—System Description and Validation[J], IEEE Transactions on Antennas and Propagation, 2019:1-12.

[2] Garcia M, Alvarez Y, Las F, et al. Unmanned Aerial System for Antenna Measurement (UASAM)[C], European Conference on Antennas and Propagation, 2018: 794-796.

[3] Shakhatreh H, Sawalmeh A, AlFuqaha A, et al. Unmanned Aerial Vehicles (UAVs): A Survey on Civil Applications and Key Research Challenges[J], IEEE Access, 2019, 7: 48572-48634.

[4] Shahzad M, Maurer M, Fraundorfer F, et al. Buildings Detection in VHR SAR Images Using Fully Convolution Neural Networks[J], IEEE Transactions on Geoscience and Remote Sensing, 2019, 57(2): 1100-1116.

[5] Girshick R. Fast R-CNN[C], Proceedings of the IEEE International Conference on Computer Vision. 2015: 1440-1448.

[6] Liu W, Anguelov D, Erhan D, et al. SSD: Single Shot Multibox Detector[C], European Conference on Computer Vision. Springer, 2016: 21-37.

[7] Redmon J, Divvala S, Girshick R, et al. You Only Look Once: Unified, Real-Time Object Detection[C], Proceedings of the IEEE Conference on Computer Vision and Pattern Recognition. 2016: 779-788.

[8] Ren S, He K, Girshick R, et al. Faster R-CNN: Towards Real-Time Object Detection with Region Proposal Networks[C], Advances in Neural Information Processing Systems, 2015: 91-99.

[9] Chen L, Zhu Y, Papandreou G, et al. Encoder-Decoder with Atrous Separable Convolution for Semantic Image Segmentation[C], Proceedings of the European Conference on Computer Vision, 2018: 801-818.

[10] Wang P, Chen P, Yuan Y, et al. Understanding Convolution for Semantic Segmentation[C], 2018 IEEE Winter Conference on Applications of Computer Vision, 2018: 1451-1460.

[11] Chen L, Papandreou G, Kokkinos I, et al. Deeplab: Semantic Image Segmentation with Deep Convolutional Nets, Atrous Convolution, and Fully Connected CRFs[J], IEEE Transactions on Pattern Analysis and Machine Intelligence, 2017, 40(4): 834-848.

[12] Long J, Shelhamer E, Darrell T. Fully Convolutional Networks for Semantic Segmentation[C], Proceedings of the IEEE Conference on Computer Vision and Pattern Recognition, 2015: 3431-3440.

[13] He K, Gkioxari G, Dollar P, et al. Mask R-CNN[C], Proceedings of the IEEE International Conference on Computer Vision. 2017: 2961-2969.

What is claimed is:

1. A method for mobile communication base station antenna measurement, comprising:
    acquiring a set of images containing antennas of a base station;
    processing the set of images with a model based on instance segmentation network, and generating visualized images corresponding to the set of images of said antennas;
    calculating, from the visualized images, quantity of said antennas of the base station and separating data for each antenna of said antennas;
    measuring parameters of each antenna by data fitting,
    wherein the measuring of said parameters comprises finding, from an individual antenna mask, a side of an antenna based on a largest area of the antenna, measuring a down-tilt angle of the antenna by employing linear fitting,
    wherein the measuring of down-tilt angle of the antenna comprises
        obtaining, via said linear fitting based on least squares, a fitting of either right edge pixels or left edge pixels of the side of said antenna as presented by the individual antenna mask,
        measuring said down-tilt angle of the antenna according to the data from the data fitting.

2. The method of claim 1, wherein the acquiring of the set of images comprises:
    capturing a video data of the antennas by at least one UAV flying around said base station;
    framing the video data into the set of images, at a reduced frame rate to the video data.

3. The method of claim 1, wherein the generating of said visualized images comprises:
    detecting all of said antennas of the base station in the set of images;
    segmenting each antenna with said individual antenna mask.

4. The method of claim 3, wherein the calculating and separating comprises:
    utilizing pixel coordinates and a threshold to measure the quantity of said antennas and separate data for each antenna of said antennas.

5. The method of claim 4, wherein the measuring of said parameters comprises:
    performing said data fitting on at least one of following: said down-tilt angle of said antenna, area of said individual antenna mask, and aspect ratio of said individual antenna mask to verify and separate each antenna in the visualized images.

6. The method of claim 4, wherein the calculating comprises:
    obtaining said pixel coordinates of an upper right corner of each masked antenna;
    calculating the quantity of said antennas based on a pixel interval and said threshold.

7. The method of claim 1, wherein the parameters comprises at least one of following, of each antenna: said down-tilt angle, said area, aspect ratio, direction angle.

8. The method of claim 1, wherein the measuring of said down-tilt angle further comprises:
    obtaining, via said linear fitting based on said least squares, fitting of both said right edge pixels and said left edge pixels of the side of said antenna as presented by said individual antenna mask;
    measuring the down-tilt angle of the antenna according to an averaging on the fitting of the right edge pixels and the fitting of said left edge pixels.

9. The method of claim 1, wherein the instance segmentation network comprises:
    backbone network, full convolution network, and region of interest alignment.

10. The method of claim 9, further comprising:
    constructing a database containing a training set of base station antenna images by image capturing with at least one UAV flying around various base stations;
    training on the training set in the database by said instance segmentation network to obtain the model.

11. The method of claim 1, wherein the acquiring of the set of images comprises:
- capturing a video data of the antennas by at least one UAV flying around said base station;
- framing the video data into the set of images, at a frame rate not greater than that of the video data.

12. A system for mobile communication base station antenna measurement, comprising a processor and a memory storing program instructions thereon, the program instructions executable by the processor to cause the system to perform:
- acquiring a set of images of antennas of a base station;
- processing the set of images with a model based on instance segmentation network, and generating visualized images corresponding to the set of images of said antennas;
- calculating, from the visualized images, quantity of said antennas of the base station and separating data for each antenna of said antennas;
- measuring parameters of each antenna by data fitting, wherein the measuring of said parameters comprises
  - finding, from an individual antenna mask, a side of an antenna based on a largest area of the antenna,
  - measuring a down-tilt angle of the antenna by employing linear fitting,
  wherein the measuring of said down-tilt angle of the antenna comprises
    - obtaining, via said linear fitting based on least squares, a fitting of either right edge pixels or left edge pixels of the side of said antenna as presented by the individual antenna mask,
    - measuring said down-tilt angle of the antenna according to the data from the data fitting.

13. A computer program product comprising a computer readable storage medium having program instructions embodied therewith, the program instructions executable by a processor coupled to a memory, the program instructions executable by the processor to cause operations comprising:
- acquiring a set of images of antennas of a base station;
- processing the set of images with a model based on instance segmentation network, and generating visualized images corresponding to the set of images of said antennas;
- calculating, from the visualized images, quantity of said antennas of the base station and separating data for each antenna;
- measuring parameters of each antenna by data fitting, wherein the measuring of said parameters comprises
  - finding, from an individual antenna mask, a side of an antenna based on a largest area of the antenna,
  - measuring a down-tilt angle of the antenna by employing linear fitting,
  wherein the measuring of said down-tilt angle of the antenna comprises
    - obtaining, via said linear fitting based on least squares, a fitting of either right edge pixels or left edge pixels of the side of said antenna as presented by the individual antenna mask,
    - measuring said down-tilt angle of the antenna according to the data from the data fitting.

* * * * *